United States Patent
Mishra et al.

(10) Patent No.: US 9,853,665 B2
(45) Date of Patent: Dec. 26, 2017

(54) METHOD FOR SELECTION BETWEEN VAMOS RECEIVER AND NON-VAMOS RECEIVER IN USER EQUIPMENT

(71) Applicant: Samsung Electronics Co., Ltd., Gyeonggi-do (KR)

(72) Inventors: Samir Kumar Mishra, Bangalore (IN); Uma Kishore Satya Venkata Godavarti, Bangalore (IN); Vikas Jain, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/221,201

(22) Filed: Jul. 27, 2016

(65) Prior Publication Data

US 2017/0187403 A1    Jun. 29, 2017

(30) Foreign Application Priority Data

Dec. 28, 2015   (IN) .................... 7007/CHE/2015 CS

(51) Int. Cl.
| | | |
|---|---|---|
| H03D 3/22 | (2006.01) |
| H04B 1/06 | (2006.01) |
| H04B 7/02 | (2017.01) |
| H04L 27/22 | (2006.01) |
| H04L 27/20 | (2006.01) |

(52) U.S. Cl.
CPC .................. *H04B 1/06* (2013.01); *H04B 7/02* (2013.01); *H04L 27/2017* (2013.01); *H04L 27/22* (2013.01)

(58) Field of Classification Search
CPC .................................... H04B 1/06; H04B 7/02
USPC .................. 375/329, 316, 219, 295; 370/252
See application file for complete search history.

(56) References Cited

U.S. PATENT DOCUMENTS

| | | | |
|---|---|---|---|
| 2011/0082689 A1 | 4/2011 | Juncker et al. | |
| 2014/0112161 A1* | 4/2014 | Rafique | H04L 43/0823 |
| | | | 370/252 |

* cited by examiner

*Primary Examiner* — Zewdu Kassa
(74) *Attorney, Agent, or Firm* — The Farrell Law Firm, P.C.

(57) ABSTRACT

An apparatus and a method are provided for selecting a receiver in a user equipment (UE). The method includes receiving, at the UE, a signal; determining, at the UE, a switch metric based on correlation metrics of a training sequence of the signal; comparing, at the UE, the switch metric with a threshold; and selecting, at the UE, one of a voice services over adaptive multi-user channels on one slot (VAMOS) receiver and a non-VAMOS receiver based on the comparing result.

17 Claims, 6 Drawing Sheets

METHOD FOR SELECTION BETWEEN VAMOS RECEIVER AND NON-VAMOS RECEIVER IN USER EQUIPMENT

PRIORITY

This application claims priority under 35 U.S.C. §119(a) to Indian Complete Patent Application Serial No. 7007/CHE/2015, which was filed in the Indian Intellectual Property Office on Dec. 28, 2015 and assigned, the entire content of which is incorporated herein by reference.

BACKGROUND

1. Field of the Disclosure

The present disclosure relates generally to a communication system, and more particularly, to selecting between a voice service over adaptive multi-user channels on one slot (VAMOS) receiver and a non-VAMOS receiver in a user equipment (UE).

2. Description of the Related Art

VAMOS is a feature introduced by 3rd Generation Partnership Project (3GPP) to efficiently utilize an available spectrum by multiplexing (or pairing) two voice users in the same radio frequency channels and time slots. In VAMOS, multiplexed (or paired) users are assigned different transmit powers and allocated on either of the quadrature sub-channels. Specifically, in an uplink (UL), VAMOS constructs a multiple-input system, which is typically formed by two UEs. A base station receives signals from both of the UEs within the same radio frequency (RF) (i.e., same frequency and time slot) and is able to differentiate the signals through post processing receiver capabilities. In a downlink (DL), multiple user's data is received with higher-order modulation mode, and each UE identifies its own signal in a specific way.

In conventional systems and methods, the base station can pair and un-pair the UEs from VAMOS without any signaling. The conventional systems and methods do not have an explicit signaling operation in the DL signal for the UE to know about modulation of the downlink signal, i.e., whether it is a Gaussian minimum shift keying (GMSK) signal (i.e., non-VAMOS signal) or alpha-quadrature phase shift keying (AQPSK) signal (i.e., VAMOS signal).

Further, even in VAMOS, during a discontinuous transmission (DTX) period in the DL for the paired user, the DL modulation for the desired user may fall back to the GMSK without any signaling, which decreases receiver performance.

Additionally, the conventional systems and methods utilize a sub-channel power imbalance ratio (SCPIR), i.e., a ratio of a desired user power to a paired user power, in order to identify the modulation of the DL signal. However, the SCPIR is not signaled in the DL signal. Further, the pairing and un-pairing of the UEs can be performed by the base station at any time, without signaling to the UE. Accordingly, it is important for the UE to seamlessly switch between a GMSK receiver and a VAMOS receiver, which negatively affects performance of the receiver in the UE.

SUMMARY

An aspect of the present disclosure is to provide a method for selecting a receiver in a UE.

Another aspect of the present disclosure is to provide a method and an apparatus for determining a switch metric based on correlation metrics of a training sequence of a signal.

Another aspect of the present disclosure is to provide a method and an apparatus for comparing a switch metric with a threshold.

Another aspect of the present disclosure is to provide a method and an apparatus for selecting a VAMOS receiver, when a switch metric is within a threshold, or a non-VAMOS receiver, when the switch metric exceeds the threshold.

In accordance with an aspect of the present disclosure, a method is provided for selecting a receiver in a UE. The method includes method includes receiving, at the UE, a signal; determining, at the UE, a switch metric based on correlation metrics of a training sequence of the signal; comparing, at the UE, the switch metric with a threshold; and selecting, at the UE, one of a VAMOS receiver and a non-VAMOS receiver based on the comparing result.

In accordance with another aspect of the present disclosure, a UE is provided, which includes a processor unit; and a memory unit including a computer executable program code, which when executed, controls the processor unit. The processor unit is configured to receive a signal; determine a switch metric based on correlation metrics of a training sequence of the signal; compare the switch metric with a threshold; and select one of a VAMOS receiver and a non-VAMOS receiver based on the comparing result.

In accordance with another aspect of the present disclosure, a computer program product is provided, which includes a computer executable program code recorded on a computer readable non-transitory storage medium. The computer executable program code, when executed, causes a UE to receive a signal; determine a switch metric based on correlation metrics of a training sequence of the signal; compare the switch metric with a threshold; and select one of a VAMOS receiver and a non-VAMOS receiver based on the comparing result.

In accordance with another aspect of the present disclosure, a UE is provided, which includes a VAMOS receiver; a non-VAMOS receiver; and a processor configured to determine a switch metric based on correlation metrics of a training sequence of a received signal; compare the switch metric with a threshold; and select the VAMOS receiver, when the switch metric is greater than or equal to the threshold, and the non-VAMOS receiver, when the switch metric is less than the threshold.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS OF THE DISCLOSURE

Figure 1:
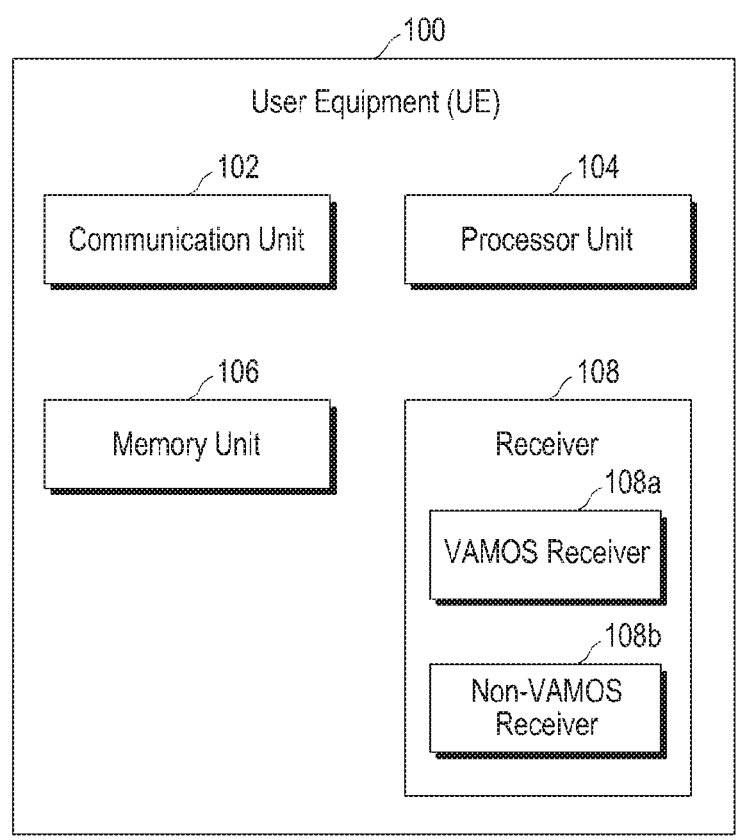
FIG. 1 illustrates a UE, according to an embodiment of the present disclosure.

The various embodiments described herein and the various features and advantageous details thereof are described more fully below with reference to the non-limiting embodiments illustrated in the accompanying drawings. Descriptions of well-known components and processing techniques are omitted to avoid obscuring the embodiments herein in unnecessary detail. Also, the various embodiments described herein are not necessarily mutually exclusive, as some embodiments can be combined with one or more other embodiments to form new embodiments.

The examples used herein are intended merely to facilitate an understanding of possible ways in which the embodiments herein can be practiced and to further enable those skilled in the art to practice the embodiments herein. Accordingly, the examples should not be construed as limiting the scope of the embodiments herein.

Herein, the term "or" refers to a non-exclusive "or", unless otherwise indicated.

Under the 3GPP release 9, a new global system for mobile communications (GSM) feature referred to as VAMOS is specified in order to provide voice capacity enhancements. Specifically, the 3GPP TS 45.001 V9.0.0 (2009 May) and 3GPP TS 45.002 V9.0.0 (2009 May) technical specifications include descriptions of VAMOS, and these specifications are hereby incorporated by reference in their entirety.

As described above, VAMOS allows for the multiplexing of at least two users simultaneously on the same physical resource both in the DL and the UL, using the same time slot number and the same frame number. As a result, a VAMOS capable physical channel supports up to four traffic channels along with their associated control channels.

In accordance with an embodiment of the present disclosure, a method for selecting a receiver in a UE includes receiving a signal, generating a first correlation metric based on a correlation of a training sequence of the signal with a local training sequence for the UE in a VAMOS mode, generating a second correlation metric based on a correlation of a training sequence of the signal with a local training sequence for the UE in a non-VAMOS mode, determining a switch metric based on the first correlation metric and the second correlation metric, comparing the switch metric with a threshold, and selecting the VAMOS receiver, when the switch metric is within the threshold, or a non-VAMOS receiver, when the switch metric exceeds the threshold.

The threshold, which distinguishes between the VAMOS mode and the non-VAMOS mode, may be determined by designing a cost function having correlation metrics of the training sequence of the signal, and estimating a hypothesis for the cost function.

An example of a VAMOS receiver is an AQPSK receiver, and an example of a non-VAMOS receiver is a GMSK receiver.

As described above, conventional systems and methods perform signaling operation in a DL signal for a UE to know about the modulation of the DL signal, i.e., whether it is GMSK (i.e., non-VAMOS) or AQPSK (i.e., VAMOS), using the SCPIR. The SCPIR indicates a relative power allocation between two sub-channels, but is not signaled in the DL signal. Further, the pairing and un-pairing can be done by the base station any time, without signaling to the UE, in which negatively affects performance of the receiver in the UE.

Unlike the conventional systems and methods, a method according to an embodiment of the present disclosure provides switching between a VAMOS receiver and a non-VAMOS receiver by separately correlating a training sequence part of a received signal with an ideal locally generated training sequence corresponding to a VAMOS mode and a non-VAMOS mode, thereby improving performance of the receiver in the UE.

For example, if a paired user is present, (i.e., both training sequences are present in the signal), both a desired user's correlation metric and a paired user's correlation metric will be high. Consequently, a product of the desired user's correlation metric and the paired user's correlation metric will also be high. Therefore, in the VAMOS mode, the metric will have a very high value as compared to the non-VAMOS mode. Thus, the signal is assumed as being an AQPSK signal.

As another example, if the paired user is not present, (i.e. the received signal merely includes the training sequence of the desired user), then the paired user's correlation metric will be a small value. Therefore, a product of the desired user's correlation metric and the paired user's correlation metric will be a low value. Hence, in the non-VAMOS mode, the metric will have a very low value as compared to the VAMOS mode. Thus, the signal is assumed as being a GMSK signal.

FIG. 1 illustrates a UE, according to an embodiment of the present disclosure.

Referring to FIG. 1, the UE 100, e.g., a mobile telephone, a smart phone, a personal data assistant (PDA), a laptop, a netbook, desktop, etc., includes a communication unit 102, a processor unit 104, a memory unit 106, and a receiver 108. Further, the receiver 108 includes a VAMOS receiver 108a and a non-VAMOS receiver 108b.

The communication unit 102, e.g., a transceiver, may transmit and receive signals. The signals can be RF signals or the like. Further, the communication unit 102 is configured to communicate internally between internal units and external devices via one or more networks.

The processor unit 104, e.g., a hardware processor, is coupled to the memory unit 106, which may include one or more computer-readable storage media. The memory unit 106 may include non-volatile storage elements, such as magnetic hard discs, optical discs, floppy discs, flash memories, or forms of electrically programmable memories (EPROM) or electrically erasable and programmable (EEPROM) memories. In addition, the memory unit 106 may be considered a non-transitory storage medium. Herein, the term "non-transitory" may indicate that the storage medium is not embodied in a carrier wave or a propagated signal, but should not be interpreted that the memory unit 106 is non-movable.

The memory unit 106 may also store larger amounts of information than a memory.

In certain examples, a non-transitory storage medium may store data that can, over time, change (e.g., in Random Access Memory (RAM) or cache).

The processor unit 104 may generate a first correlation metric ($C_d$) and a second correlation metric ($C_p$) based on a correlation of a training sequence of the signal with a local training sequence for the UE 100 in a VAMOS mode and a non-VAMOS mode, respectively. For example, the first correlation metric ($C_d$) is may be a desired user correlation metric, and the second correlation metric ($C_p$) may be a paired user correlation metric, or the first correlation metric ($C_d$) may be the paired user correlation metric, and the second correlation metric ($C_p$) may be the desired user correlation metric. Based on generating the first correlation metric ($C_d$) and the second correlation metric ($C_p$), the processor unit 104 is configured to determine a switch metric.

Herein, $tsc^{(d)}$ & $tsc^{(p)}$ refer to an ideal locally generated training sequence of a desired user and an ideal locally generated training sequence of a paired user respectively. $y^{(i)}(n)$ refers to an $i^{th}$ stream of oversampled in-phase/quadrature (IQ) data. $y^{(0)}(n)$ means indicates first oversampled IQ data and $y^{(1)}(n)$ indicates second oversampled IQ data. A threshold may be a pre-defined threshold.

The calculation of a desired user correlation metric ($C_d$) may be performed using Equation (1) below.

$$C_d = |\Sigma_{i=0}^{1} \Sigma_{m=0}^{25} y^{(i)}(n+m) \cdot tsc^{(d)}(m)|^2 \quad (1)$$

The calculation of a paired user correlation metric ($C_p$) may be performed using Equation (2) below.

$$C_d = |\Sigma_{i=0}^{1} \Sigma_{m=0}^{25} y^{(i)}(n+m) \cdot tsc^{(p)}(m)|^2 \quad (2)$$

The calculation of a switch metric may be performed using Equation (3) below.

$$\text{switchmetric} = C_d * C_p \quad (3)$$

The switch metric is robust to the extent that it may not generate a false alarm for a carrier to interference ratio as low as −6.5 dB, which is well below downlink advanced receiver performance (DARP) ranges.

After determining the switch metric, the processor unit 104 may compare the switch metric with a threshold. For example, the threshold may be determined using a quadratic classifier technique.

As indicated above, the threshold may be used to differentiate between the VAMOS mode and the non-VAMOS mode.

Based on the comparison of the switch metric with the threshold, the processor unit 104 may select the VAMOS receiver 108a, when the switch metric is within the threshold, or the non-VAMOS receiver 108b, when the switch metric exceeds the threshold, e.g., as shown in Equations (4) and (5) below.

if (metric≥Thresh),Signal Type=AQPSK(VAMOS mode) (4)

if (metric<Thresh),Signal Type=GMSK(non-VAMOS mode) (5)

The VAMOS receiver 108a may be an AQPSK receiver, and the non-VAMOS receiver 108b may be a GMSK receiver or a single antenna interference cancellation (SAIC) receiver.

For example, if the paired user is present, (i.e., both training sequences are present in the signal), both the desired user's correlation metric ($C_d$) and the paired user's correlation metric ($C_p$) are high. Consequently, the product ($C_d * C_p$) is also high. Therefore, in the VAMOS mode, the switch metric can have a very high value, as compared to the non-VAMOS mode (or GMSK mode). Thus, the signal may be identified as the AQPSK signal.

As another example, if the paired user is not present in the signal (i.e., the received signal includes only the training sequence of the desired user), then the paired user's correlation metric ($C_p$) will have small value. Hence, the product ($C_d * C_p$) will also be low. Accordingly, in the non-VAMOS mode, the switch metric value will be low, as compared with the VAMOS mode, and the signal may be identified as the GMSK signal.

The UE 100 illustrated in FIG. 1 is not limited to the specific structure therein, e.g., the UE 100 may include fewer or additional units than those illustrated in FIG. 1. Further, the labels or names of the units illustrated in FIG. 1 are used only for illustrative purpose and do not limit the scope of the disclosure. Further, one or more of the illustrated units can be combined together, e.g., in a system on chip (SoC) or an integrated circuit (IC), to perform same or substantially similar functions described above.

Figure 2:
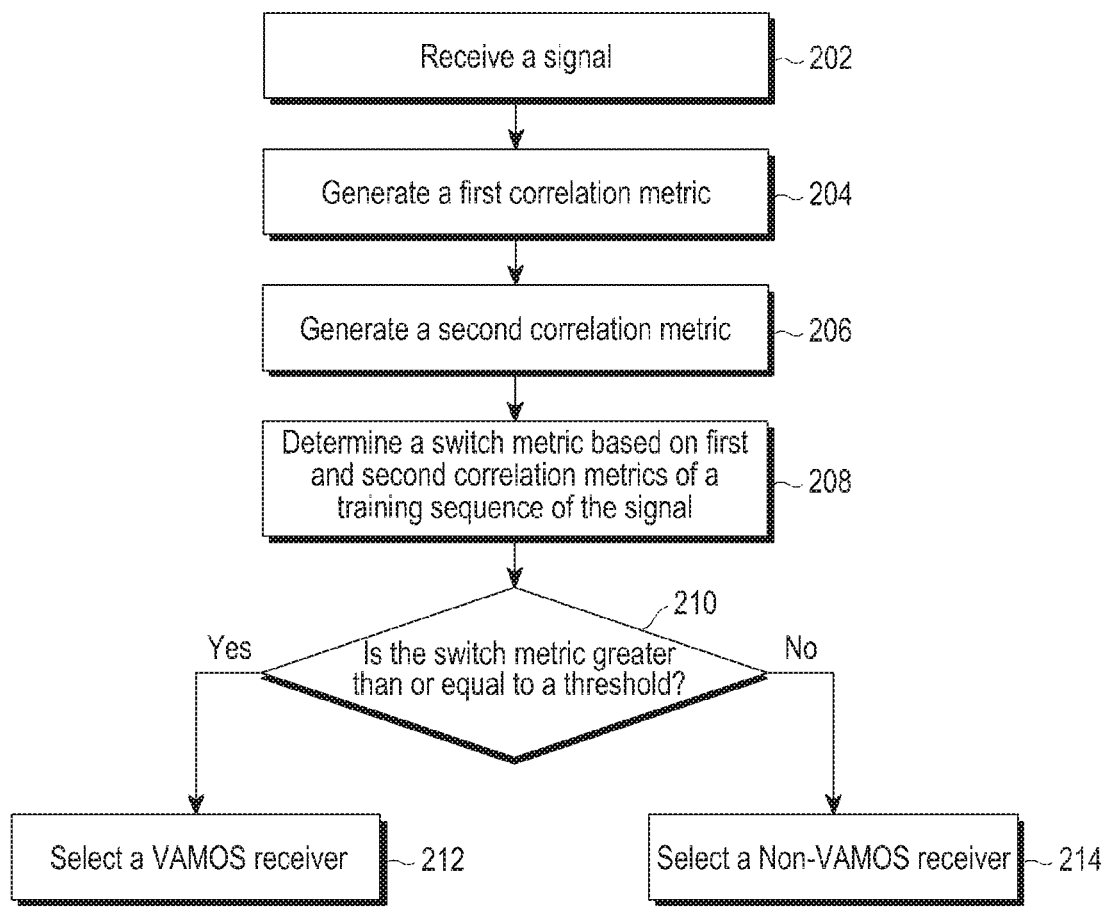
FIG. 2 is a flow diagram illustrating a method for selecting a receiver in the UE, according to an embodiment of the present disclosure.

FIG. 2 is a flow diagram illustrating a method for selecting a receiver in a UE, according to an embodiment of the present disclosure. For example, the method illustrated in FIG. 2 may be performed by the UE 100 illustrated in FIG. 1.

Referring to FIG. 2, in step 202, the UE 100, e.g., the communication unit 102 therein, receives a signal.

In step 204, the UE 100, e.g., the processor unit 104 therein, generates a first correlation metric ($C_d$) based on a correlation of a training sequence of the signal with a local training sequence for the UE 100 in the VAMOS mode.

In step 206, the processor unit 104 generates a second correlation metric ($C_p$) based on the correlation of the training sequence of the signal with a local training sequence for the UE 100 in the non-VAMOS mode.

In step 208, the processor unit 104 determines a switch metric based on the first correlation metric ($C_d$) and the second correlation metric ($C_p$).

In step 210, the processor unit 104 compares the switch metric with a threshold. If the switch metric is greater than or equal to the threshold, the processor unit 104 selects the VAMOS receiver 108a, e.g., using Equation (4) above, e.g., an AQPSK receiver.

For example, if the paired user is present, (i.e., both training sequences are present in the signal received in step 202), both the desired user's correlation metric ($C_d$) and the paired user's correlation metric ($C_p$) will be high, and their product ($C_d * C_p$) will also be high. Therefore, in the VAMOS mode, the switch metric will have a very high value as compared to the non-VAMOS mode (or GMSK mode), and the received signal is identified as being the AQPSK signal.

However, if the switch metric is not greater than or equal to the threshold in step 210, the processor unit 104 selects the non-VAMOS receiver 108b, e.g., using Equation (5) above. For example, if the paired user is not present in the signal (i.e., the received signal includes only the training sequence of the desired user), then the paired user's correlation metric ($C_p$) will be small value and the product ($C_d * C_p$) will also be low. Therefore, in the non-VAMOS mode, the switch metric value will be low compared with the VAMOS mode, and the received signal is identified as being the GMSK signal.

The various actions, acts, blocks, steps, etc., illustrated in FIG. 2 may be performed in the order presented, in a different order, or simultaneously. Further, some of the actions, acts, blocks, steps, etc., illustrated in FIG. 2 may be omitted, added, modified, skipped, etc., without departing from the scope of the disclosure.

Figure 3:
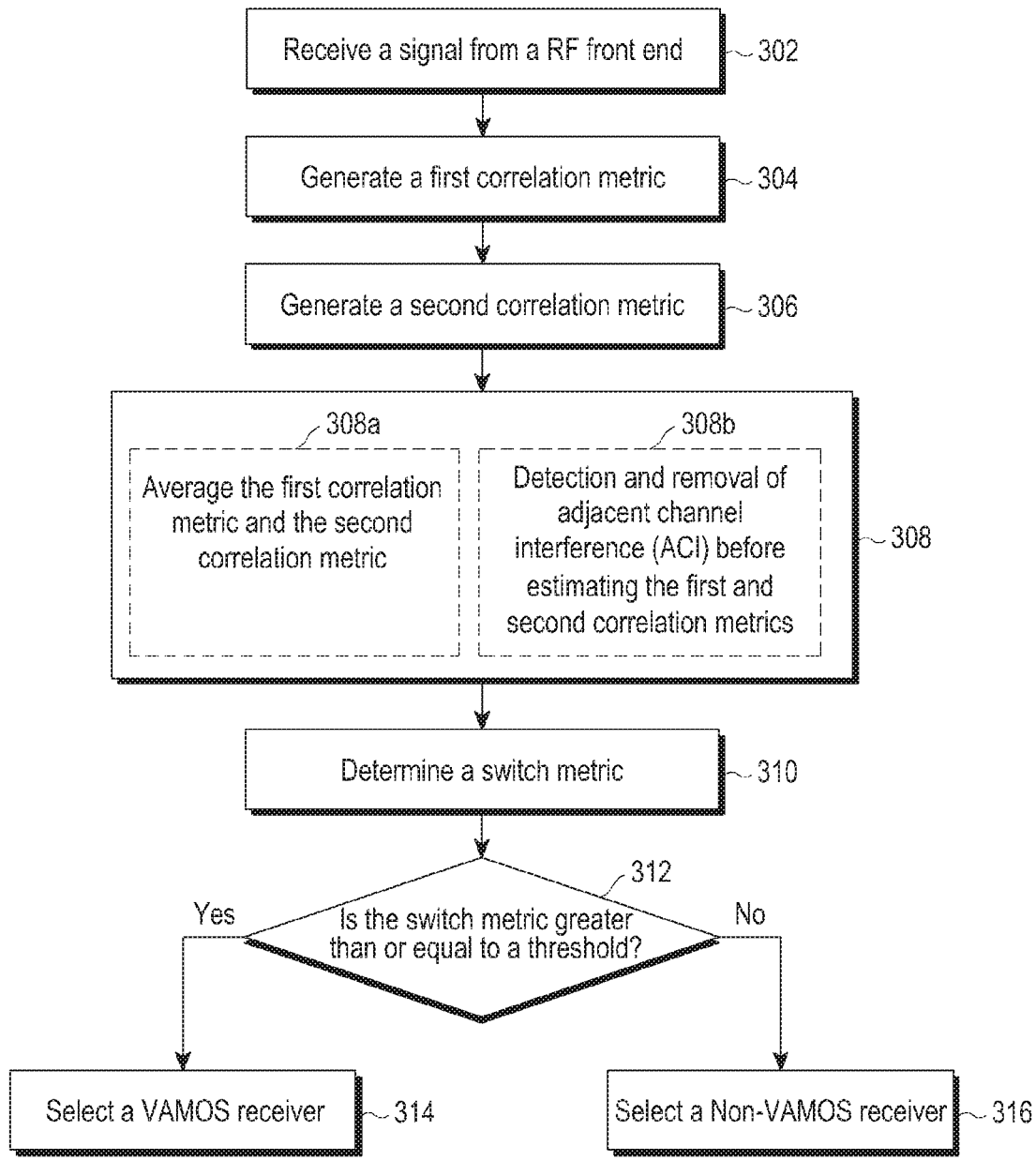
FIG. 3 is flow diagram illustrating a method for selecting a receiver in the UE during noise conditions, according to an embodiment of the present disclosure.

FIG. 3 is a flow diagram illustrating a method for selecting a receiver in a UE during various noise conditions, according to an embodiment of the present disclosure. For example, the method illustrated in FIG. 3 may also be performed by the UE 100 illustrated in FIG. 1. Referring to FIG. 3, in step 302, the UE 100, e.g., the communication unit 102 therein, receives a signal from an RF front end.

In step 304, the UE 100, e.g., the processor unit 104 therein, generates a first correlation metric ($C_d$) based on a correlation of a training sequence of the signal with a local training sequence for the UE 100 in the VAMOS mode.

In step 306, the processor unit 104 generates a second correlation metric ($C_p$) based on a correlation of the training sequence of the signal with a local training sequence for the UE 100 in the non-VAMOS mode.

In step 308a, the processor unit 104 averages the first correlation metric ($C_d$) and the second correlation metric ($C_p$), e.g., using a 2-tap infinite impulse response (IIR) filter.

The processor unit 104 may reset the correlation metrics ($C_d$ and $C_p$) for every MAX_ITER frames.

itch The switch metric is dependent on an instantaneous correlation between the received signal and the training sequence of the first correlation metric ($C_d$) and the second correlation metric ($C_p$), which are prone to estimation errors. Accordingly, in order to minimize switch decision errors, these metrics are averaged across time, e.g., using the 2-tap IIR filter.

For example, if $\alpha$ and $\beta$ are averaging factors of the correlation metrics ($C_d * C_p$), respectively, at a reset or a first iteration, instantaneous values are taken, and from the second iteration, averaging starts and continues for a length of MAX_ITER until the values are reset again, then $\alpha$, $\beta$, and MAX_ITER can be tuned for best performance and the formulae for averaging, as shown below.

Initial state: −1 represents the initial state or before time.
iter=0
$C_{d[-1]}=0$
$C_{p[-1]}=0$
Averaging: Let $\rho_{inst}$, $C_d$, $C_p$ represent the instantaneous values
At first iteration,
$C_{d[iter]}=C_d$
$C_{p[iter]}=C_p$
From second iteration, till MAX_ITER iterations
$C_{d[iter]}=\alpha \cdot C_{d[iter-1]}+(1-\alpha) \cdot C_d$
$C_{p[iter]}=\beta \cdot C_{p[iter-1]}+(1-\beta) \cdot C_p$
metric=$C_{d[iter]} * C_{p[iter]}$
At iteration number MAX_ITER, all the parameters $C_d$ and $C_p$ are reset.

In the method of FIG. 3, the processor unit 104 may average the correlation metrics based on a timing offset mechanism.

For example, it is possible that a timing offset in received signals can negatively impact correlation metrics ($C_d$ and $C_p$). However, the timing error could be in the range of one sample signal to the right or one sample to the left. Hence, the correlation metrics ($C_d$ and $C_p$) can be averaged over three summations at an offset of −1, 0, and +1, respectively. In this case, the correlation metrics may be obtained by using Equations (6) and (7) below.

A desired user correlation metric ($C_d$) may be calculated using Equation (6).

$$C_d = \frac{1}{3} \left| \sum_{i=0}^{1} \sum_{n=-1}^{1} \sum_{m=0}^{25} y^{(i)}(n+m) \cdot tsc^{(d)}(m) \right|^2 \quad (6)$$

A paired user correlation metric ($C_p$) may be calculated using Equation (7).

$$C_p = \frac{1}{3} \left| \sum_{i=0}^{1} \sum_{n=-1}^{1} \sum_{m=0}^{25} y^{(i)}(n+m) \cdot tsc^{(p)}(m) \right|^2 \quad (7)$$

In step 308b, the processor unit 104 detects and removes an adjacent channel interference (ACI) before estimating the first and second correlation metrics ($C_d$ and $C_p$). For example, the correlation metrics ($C_d$ and $C_p$) may be very robust against a co-channel interference (CCI) but a little sensitive to ACI. Detection and removal of the ACI before estimating the correlation metrics ($C_d$ and $C_p$) may result in a more accurate metric. Alternatively, this process can be performed by an RF front end filtering.

In step 310, the processor unit 104 determines the switch metric.

In step 312, the processor unit 104 to compares the switch metric with a threshold.

If the switch metric is greater than or equal to the threshold, the processor unit 104 selects the VAMOS receiver 108a, e.g., the AQPSK receiver, in step 314, e.g., using Equation (4) above. The VAMOS receiver 108a can be the AQPSK receiver. In an embodiment, the method 300 allows the processor unit 104 to select the VAMOS receiver 108a when the switch metric is within the threshold.

However, if the switch metric is not greater than or equal to the threshold in step 310, the processor unit 104 selects the non-VAMOS receiver 108b, e.g., the GMSK receiver, e.g., using Equation (5) above.

The correlation metrics ($C_d$ and $C_p$) may be obtained by using existing techniques. The correlation metrics ($C_d$ and $C_p$) are used to generate a noise covariance or noise power, which may be an important parameter in equalization of the received signal. A more accurate estimation of the noise covariance or noise power using the correlation metrics ($C_d$ and $C_p$) provides a better gain of 0.5~0.7 in the receiver performance for the VAMOS signals.

Further, the correlation metrics ($C_d$ and $C_p$) may also be used for determining the active sub-channel (i.e., whether the base station scheduled UE is on a real plane or the complex plane). The information of the active sub-channel is used in designing an extremely low complexity VAMOS receiver 108a, without using any additional hardware elements.

The various actions, acts, blocks, steps, etc., illustrated in FIG. 3 may be performed in the order presented, in a different order or simultaneously. Further, some of the actions, acts, blocks, steps, etc., illustrated in FIG. 3 may be omitted, added, modified, skipped, etc., without departing from the scope of the invention.

Figure 4:
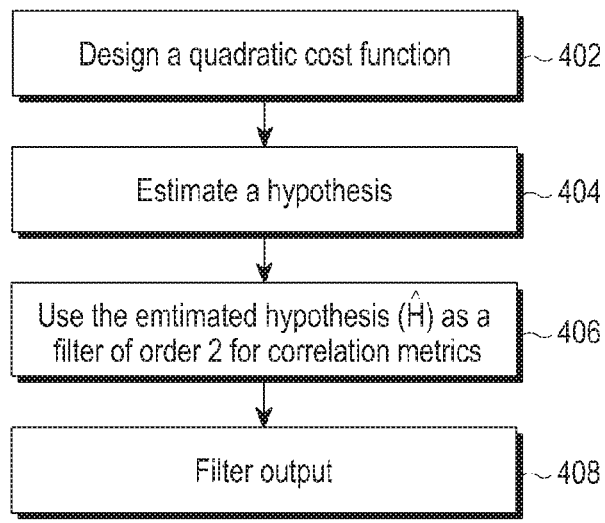
FIG. 4 is a flow diagram illustrating a method for determining a threshold, according to an embodiment of the present disclosure.

FIG. 4 is a flow diagram illustrating a method for determining a threshold, according to an embodiment of the present disclosure. For example, the method illustrated in FIG. 4 may also be performed by the UE 100 illustrated in FIG. 1.

Referring to FIG. 4, in step 402, the UE 100, e.g., the processor unit 104 therein, designs a quadratic cost function (J) involving the correlation metrics ($C_d$ and $C_p$).

In step 404, the processor unit 104 estimates the hypothesis ($\hat{H}$) for which the cost function J reaches its global minimum.

In step 406, processor unit 104 uses the estimated hypothesis ($\hat{H}$) as a filter of order 2 for the correlation metrics ($C_d$ and $C_p$).

In step 408, the processor unit 104 filters an output (θ) between 0 and 1, considering normalized inputs.

As indicated above, the threshold may be used to distinguish between the VAMOS mode and the non-VAMOS mode, and the method illustrated in FIG. 4 determines the threshold using a two dimensional quadratic classifier algorithm.

The various actions, acts, blocks, steps, etc., illustrated in FIG. 4 may be performed in the order presented, in a different order, or simultaneously. Further, some of the actions, acts, blocks, steps, etc., may be omitted, added, modified, skipped, etc., without departing from the scope of the invention.

Figure 5:
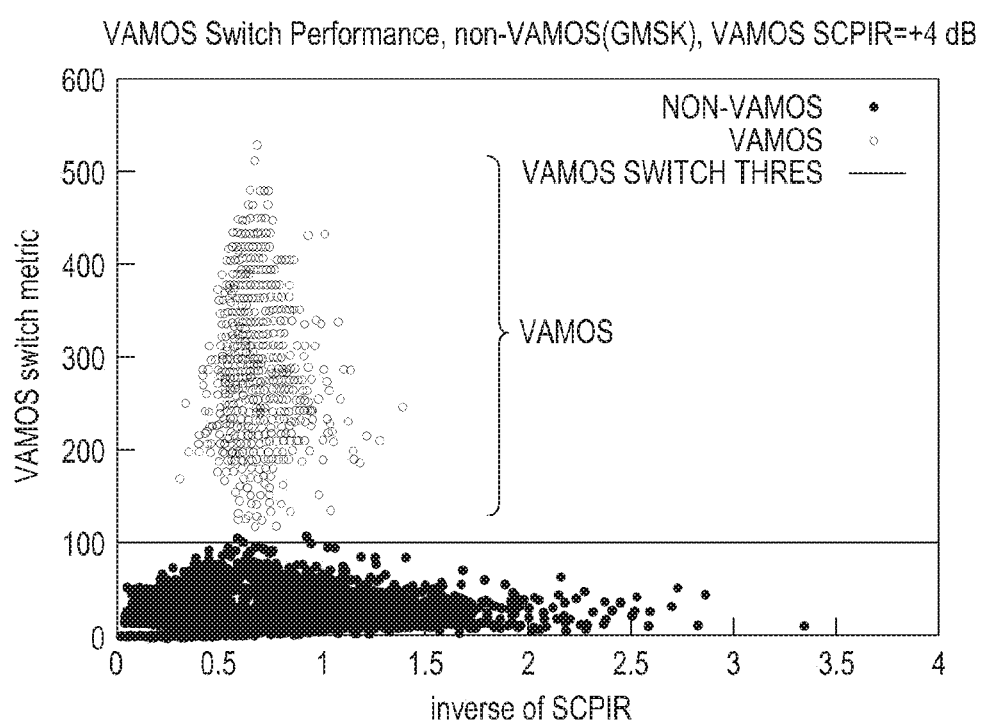
FIG. 5 is a graph illustrating a separation of a VAMOS receiver and a non-VAMOS receiver based on a threshold, according to an embodiment of the present disclosure.

FIG. 5 is a graph illustrating separation of a VAMOS receiver and a non-VAMOS receiver based on a threshold, according to an embodiment of the present disclosure. Specifically, the graph in FIG. 5 illustrates a clear separation of the non-VAMOS receiver and the VAMOS receiver based on the threshold.

Referring to FIG. 5, there is only one (1) false alarm and two (2) misdetections.

FIG. 5 shows a result of radio conformance tests observed for several hours, i.e., a Downlink Advanced receiver Performance Scenario in which a channel profile is Typical Urban with a vehicle speed at 50 kilometers per hour, i.e., TU50.

In the test case, there is a single interferer which is a random GMSK signal (i.e., non-VAMOS signal) or the AQPSK signal (i.e., VAMOS signal). The range of the carrier-to-interference ratio in this test case is from +6 dB to −8 dB. The SCPIR is fixed at a constant value of +4 dB and signifies the worst-case scenario for the switch here.

In FIG. 5, the values of the estimated SCPIR are plotted against the values of the switch metric, which is derived according to an embodiment of the present disclosure.

As shown in FIG. 5, most of the points which signify non-VAMOS are below 100 and most of the points which signify the VAMOS are above 100. Thus, 100 can be chosen as a suitable threshold for the embodiment disclosed herein.

Figure 6:
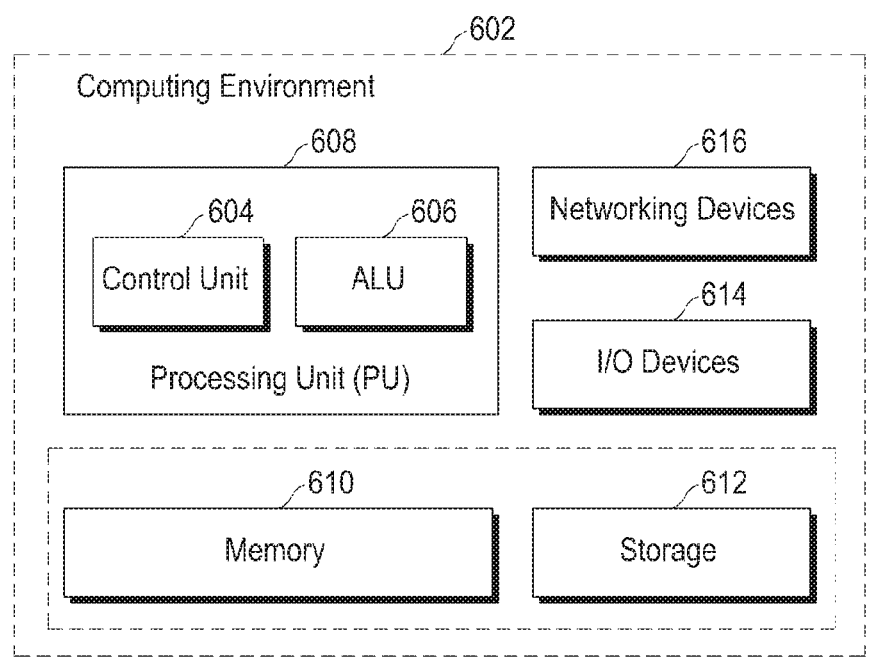
FIG. 6 illustrates a computing environment for implementing a method for selecting a receiver in a UE, according to an embodiment of the present disclosure.

FIG. 6 illustrates a computing environment for implementing a method for selecting a receiver in a UE, according to an embodiment of the present disclosure.

Referring to FIG. 6, the computing environment 602 includes a processing unit 608, a memory 610, a storage unit 612, a plurality of networking devices 616, and a plurality Input output (I/O) devices 614.

The processing unit 608 includes a control unit 604 and an arithmetic logic unit (ALU) 606, and is responsible for processing the instructions. The processing unit 608 receives commands from the control unit 604 in order to perform processing. Further, any logical and arithmetic operations involved in the execution of the instructions may be computed using the ALU 606.

The overall computing environment 602 may include multiple homogeneous or heterogeneous cores, multiple central processing units (CPUs) of different kinds, special media and other accelerators. Further, a plurality of processing units including the processing unit 608 may be located on a single chip or over multiple chips.

A technique including instructions and codes required for implementation are stored in either the memory unit 610 and/or the storage 612. At the time of execution, the instructions may be fetched from the corresponding memory 610 or storage 612, and executed by the processing unit 608.

In case of any hardware implementations, various networking devices 616 or external I/O devices 614 may be connected to the computing environment 602 to support the implementation through the networking unit and the I/O device unit.

The embodiments disclosed herein can be implemented through at least one software program running on at least one hardware device and performing network management functions to control the elements. Further, the elements illustrated in FIGS. 1 to 6 include blocks that can be at least one of a hardware device, or a combination of hardware device and software module.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method for selecting a receiver in a user equipment (UE), the method comprising:
   receiving, at the UE, a signal;
   generating a first correlation metric based on a correlation of a training sequence of the signal with a local training sequence for the UE in a voice services over adaptive multi-user channels on one slot (VAMOS) mode;
   generating a second correlation metric based on a correlation of the training sequence of the signal with a local training sequence for the UE in a non-VAMOS mode;
   determining a switch metric based on the first correlation metric and the second correlation metric;
   comparing, at the UE, the switch metric with a threshold; and
   selecting, at the UE, one of a VAMOS receiver and a non-VAMOS receiver based on the comparing result.

2. The method of claim 1, wherein selecting the one of the VAMOS receiver and the non-VAMOS receiver comprises:
   selecting the VAMOS receiver when the switch metric is greater than or equal to the threshold; and
   selecting the non-VAMOS receiver when the switch metric is less than the threshold.

3. The method of claim 1, further comprising:
   designing a cost function including a correlation metric of the training sequence of the signal;
   estimating a hypothesis for the cost function; and
   determining the threshold based on the hypothesis.

4. The method of claim 1, wherein the threshold distinguishes between the VAMOS mode and the non-VAMOS mode.

5. The method of claim 1, wherein the VAMOS receiver includes an alpha-quadrature phase shift keying (AQPSK) receiver.

6. The method of claim 1, wherein the non-VAMOS receiver includes a Gaussian minimum shift keying (GMSK) receiver.

7. A user equipment (UE) comprising:
   at least one processor; and
   a memory including a computer executable program code, which when executed, controls the at least one processor,
   wherein the at least one processor is configured to:
   receive a signal;
   generate a first correlation metric based on a correlation of a training sequence of the signal with a local training sequence for the UE in a voice services over adaptive multi-user channels on one slot (VAMOS) mode;
   generate a second correlation metric based on a correlation of the training sequence of the signal with a local training sequence for the UE in a non-VAMOS mode;
   determine a switch metric based on the first correlation metric and the second correlation metric;
   compare the switch metric with a threshold; and select one of a VAMOS receiver and a non-VAMOS receiver based on the comparing result.

8. The UE of claim 7, wherein the at least one processor is further configured to select the VAMOS receiver when the switch metric is greater than or equal to the threshold, and select the non-VAMOS receiver when the switch metric is less than the threshold.

9. The UE of claim 7, wherein the computer executable program code controls the at least one processor to:
design a cost function including a correlation metric of the training sequence of the signal;
estimate a hypothesis for the cost function; and
determine the threshold based on the hypothesis.

10. The UE of claim 9, the threshold distinguishes between the VAMOS mode and the non-VAMOS mode.

11. The UE of claim 7, wherein the VAMOS receiver comprises an alpha-quadrature phase shift keying (AQPSK) receiver.

12. The UE of claim 7, wherein the non-VAMOS receiver comprises a Gaussian minimum shift keying (GMSK) receiver.

13. A computer program product comprising a computer executable program code recorded on a computer readable non-transitory storage medium, wherein the computer executable program code, when executed, causes a user equipment to:
receive a signal;
generate a first correlation metric based on a correlation of a training sequence of the signal with a local training sequence for the UE in a voice services over adaptive multi-user channels on one slot (VAMOS) mode;
generate a second correlation metric based on a correlation of the training sequence of the signal with a local training sequence for the UE in a non-VAMOS mode;
determine a switch metric based on the first correlation metric and the second correlation metric;
compare the switch metric with a threshold; and
select one of a VAMOS receiver and a non-VAMOS receiver based on the comparing result.

14. The computer program product of claim 13, wherein the computer executable program code causes the user equipment to:
select the VAMOS receiver when the switch metric is greater than or equal to the threshold; and
select the non-VAMOS receiver when the switch metric is less than the threshold.

15. The computer program product of claim 13, wherein the computer executable program code causes the user equipment to:
design a cost function include a correlation metric of the training sequence of the signal;
estimate a hypothesis for the cost function; and
determine the threshold based on the hypothesis.

16. The computer program product of claim 13, wherein the VAMOS receiver includes an alpha-quadrature phase shift keying (AQPSK) receiver.

17. The computer program product of claim 13, wherein the non-VAMOS receiver includes a Gaussian minimum shift keying (GMSK) receiver.

* * * * *